US006304428B1

(12) United States Patent
Sato

(10) Patent No.: US 6,304,428 B1
(45) Date of Patent: Oct. 16, 2001

(54) HOUSING FOR AN AC ADAPTER IN AN ELECTRIC INSTRUMENT

(75) Inventor: Hitoshi Sato, Tokyo (JP)

(73) Assignee: Japan CBM Corporation, Tokyo (JP)

( * ) Notice: Subject to any disclaimer, the term of this patent is extended or adjusted under 35 U.S.C. 154(b) by 0 days.

(21) Appl. No.: 09/599,871

(22) Filed: Jun. 23, 2000

(30) Foreign Application Priority Data

Jun. 25, 1999 (JP) ................................................ 11-180959

(51) Int. Cl.[7] ...................................................... H02B 1/00

(52) U.S. Cl. .......................... 361/600; 361/679; 361/683; 361/686; 312/223.2; 364/708.1

(58) Field of Search .................................... 361/683, 686, 361/687; 364/708.1; 312/223.2

(56) References Cited

U.S. PATENT DOCUMENTS 3,666,886 * 5/1972 Schneider .............................. 178/78
5,189,520 * 2/1993 Okayasu et al. ..................... 348/376
5,574,256 * 11/1996 Cottone ................................. 174/53
5,575,807 11/1996 Faller .
5,673,173 * 9/1997 Tsai ...................................... 361/686
5,703,751 * 12/1997 Huang .................................. 361/625
6,134,104 * 10/2000 Mohi et al. .......................... 361/683
6,157,958 * 12/2000 Armitage et al. .................... 709/250

FOREIGN PATENT DOCUMENTS

000709685A1 * 5/1996 (EP) .

OTHER PUBLICATIONS

Abstract: No. 11198482, date: Jul. 27, 1999; inventor: Kobayashi Ryoichi; entitled “Thermal printer”.
Abstract: No. 10028152, date: Jan. 27, 1998; inventor: Iwata Teruo; entitled “Portable Telephone Set”.
Abstract: No. 07104895, date: Apr. 21, 1995; inventor: Tadokoro Yoshikazu; entitled “Electronic Equipment”.
Abstract: No. 0517669, date Jul. 13, 1993; inventor: Tajima Tadao; entitled “Mounting Device of Electronic Apparatus”.
Abstract: No. 07264855, date Oct. 13, 1995; inventor: Hata KAnjirou; entitled “Power Supply”.

* cited by examiner

*Primary Examiner*—Leo P. Picard
*Assistant Examiner*—Boris L. Chervinsky
(74) *Attorney, Agent, or Firm*—Birch, Stewart, Kolasch & Birch LLP

(57) ABSTRACT

A main housing and a sub-housing are provided. In the main housing an electric instrument is mounted, and in the sub-housing an AC adapter is mounted. The sub-housing is detachably engaged with the main housing.

1 Claim, 5 Drawing Sheets

HOUSING FOR AN AC ADAPTER IN AN ELECTRIC INSTRUMENT

FIELD OF THE INVENTION

The present invention relates to a housing for an AC adapter in an electric instrument such as a printer.

BACKGROUND OF THE INVENTION

AC adapters for supplying a direct current to an electric instrument are known.

Further, it is known to provide an electric instrument including a small size instrument without an AC adapter therein, wherein the AC adapter is separately positioned where the AC adapter is concealed.

FIG. 5 shows a conventional printer and a conventional AC adapter, based on the above described desire.

An AC adapter 9 has an AC cord 12 having an input plug 12*b* to be connected to an AC socket and an end plug 12*a* connected to a socket 9*a* of the AC adapter 9.

A DC cord 10 is connected to an output terminal (not shown) of the AC adapter 9. An output plug 10*a* of the DC cord 10 is connected to a socket 11 of a printer. The AC adapter 9 converts an AC to a DC, for example, 100 volts AC to 25 volts DC.

In the conventional printer, the exposed AC adapter 9 deteriorates the appearance of the printer when there is no place for concealing the AC adapter. In addition, the adapter occupies a space to decrease the area for the printer.

Therefore, there is a need in the art for an AC adapter that can be mounted in the printer even if the size of the printer becomes somewhat large.

SUMMARY OF THE INVENTION

Accordingly an object of the present invention is to provide a housing for mounting an AC adapter in an electric instrument, thereby the adapter does not deteriorate the electric instrument and reduce the space for the instrument.

According to the present invention, there is provided a housing for an AC adapter in an electric instrument comprising, a main housing in which an electric instrument is mounted, a sub-housing in which an AC adapter is mounted, the sub-housing being detachably engaged with the main housing. The sub-housing is attached to an underside of the electric instrument. The AC adapter is removably mounted in the sub-housing.

These and other objects and features of the present invention will become more apparent from the following detailed description with reference to the accompanying drawings.

DETAILED DESCRIPTION OF THE PREFERRED EMBODIMENT

Figure 1:
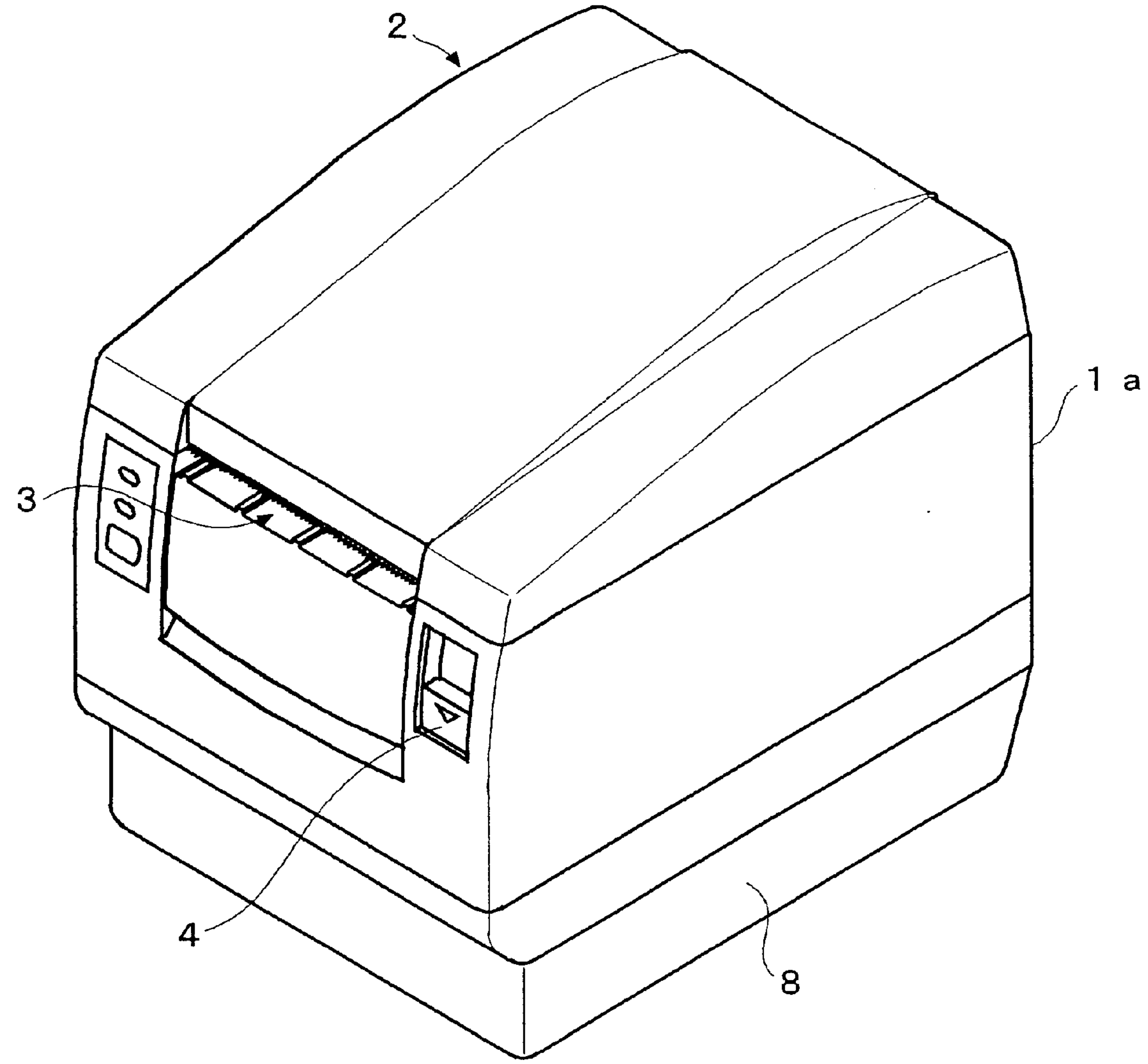
FIG. 1 is a perspective view of a printer to which the present invention is applied.
Figure 5:
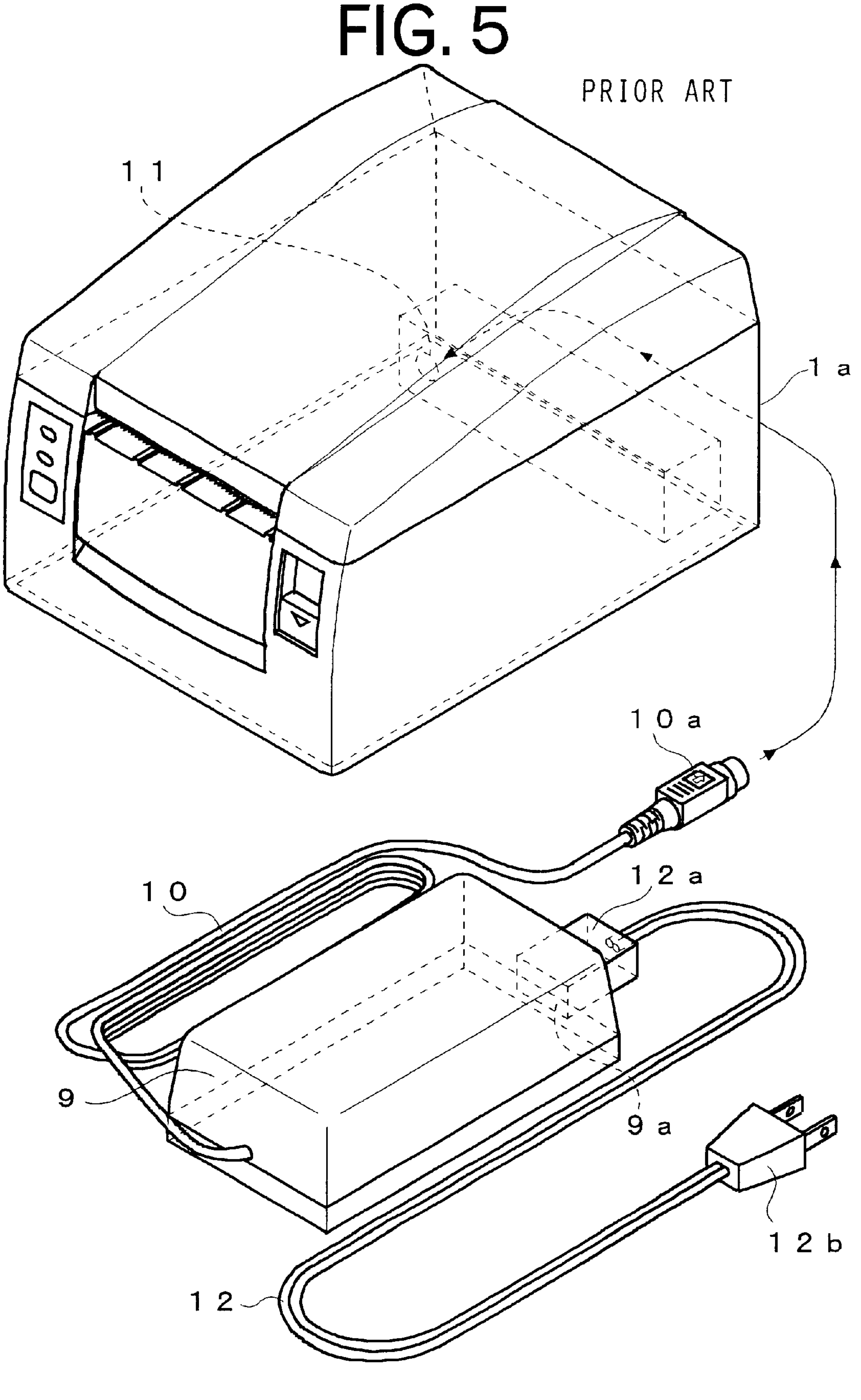
FIG. 5 PRIOR ART
FIG. 5 is a perspective view of a conventional printer and a conventional power source adapter.

In the drawings, the same parts as the conventional device of FIG. 5 are identified by the same reference numerals as FIG. 5. Referring to FIG. 1 showing a perspective view of a printer, the printer comprises a main housing 1*a*, cover 2 and a bottom sub-housing 8 in which the AC adapter 9 (FIG. 3) is mounted. There is provided a cover lock release button 4, and a paper discharge opening 3 on the front panel of the printer.

Figure 2:
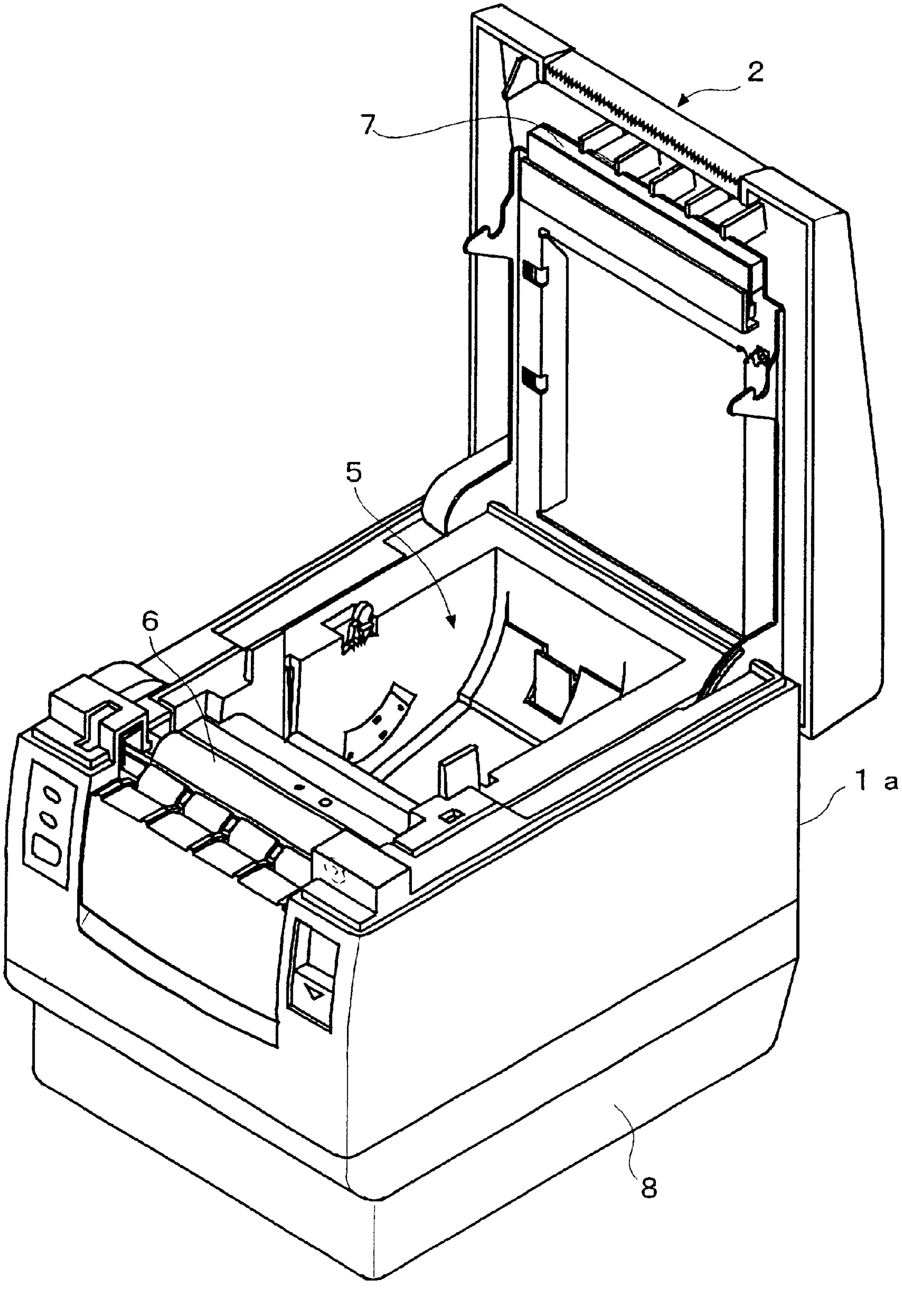
FIG. 2 is a perspective view of the printer wherein a cover of the printer is opened.
Figure 3:
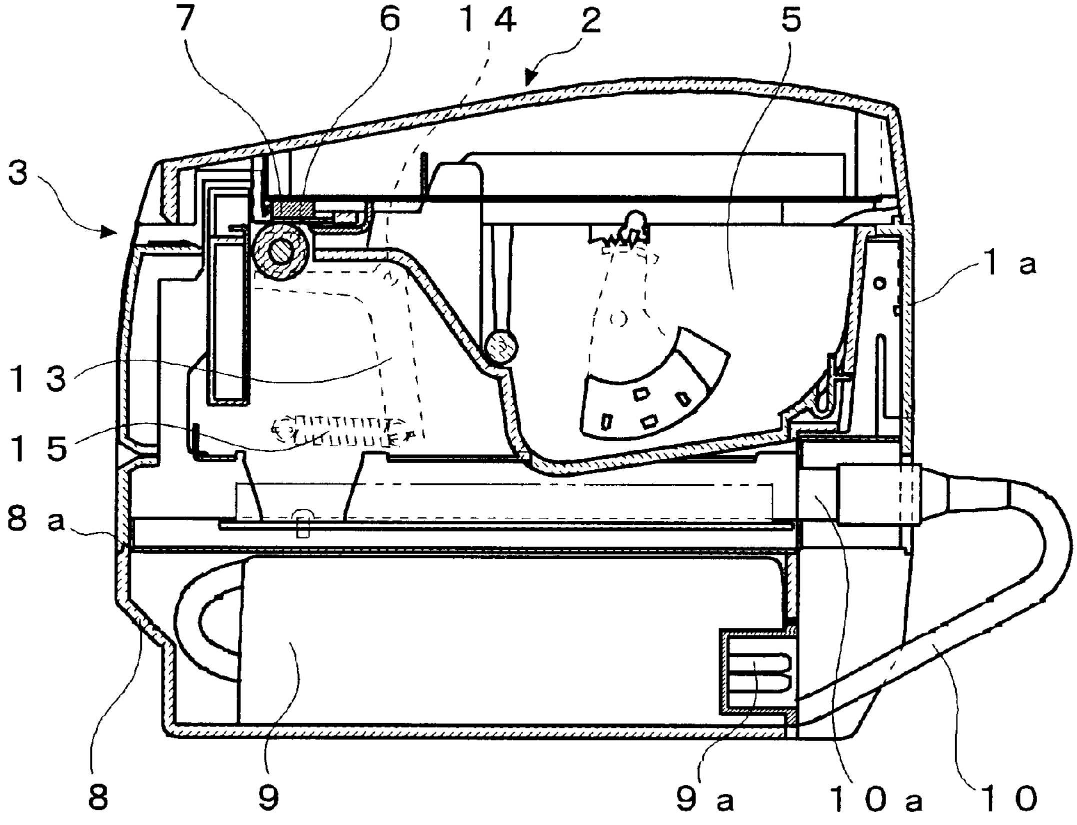
FIG. 3 is a sectional side view of the printer.
Figure 4:
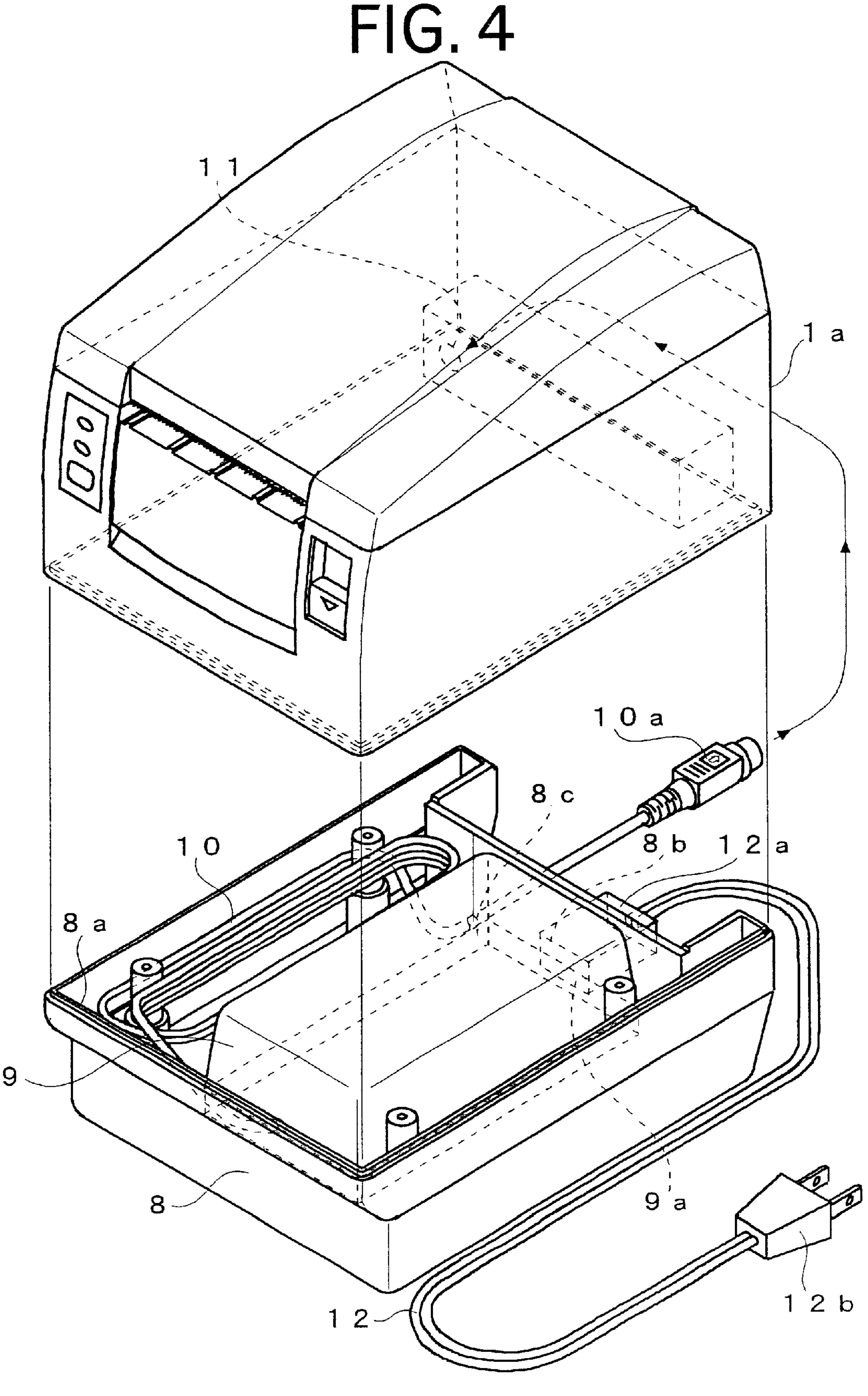
FIG. 4 is a perspective view of the printer wherein a housing for a power source adapter is detached from the printer.

Referring to FIGS. 2 through 4, in the housing 1*a*, a rolled paper housing space 5 is provided and a platen 6 is vertically slidably mounted. A platen push lever 13 is rotatably mounted by a shaft 14 and urged to the platen 6 by a spring 15 so as to press the platen to a print head 7 mounted in the cover 2.

The sub-housing 8 is snugly and detachably fitted to the underside of the main housing by a fitting means 8*a*. The plug 12*a* is connected to a socket 9*a* in recess 8*b* of the sub-housing 8.

In the sub-housing 8, the DC cord 10 is mounted. The DC cord 10 is drawn from the sub-housing passing through a C-shaped opening 8*c*. The plug 10*a* is connected to the socket 11 of the printer. The DC cord 10 can be removed from the C-shaped opening 8*c*.

When the printer is used in a small size condition without sub-housing 8, the sub-housing 8 is removed from the main housing 1*a*. The AC adapter 9 and the DC cord 10 are removed from the sub-housing 8 and the plug 12*b* is connected to an AC socket. The DC cord 10 is pulled and the plug 10a is connected to the socket 11 of the printer.

The AC adapter may be used without removing from the sub-housing 8.

In accordance with the present invention, since the AC adapter is concealed, the appearance of the electric instrument is not deteriorated. In addition, the instrument can be used by removing the AC adapter.

While the invention has been described in conjunction with preferred specific embodiment thereof, it will be understood that this description is intended to illustrate and not limit the scope of the invention, which is defined by the following claims.

What is claimed is:

1. A housing for an AC adapter in an electric instrument comprising:

a main housing in which an electric instrument is mounted;

a sub-housing in which an AC adapter and a DC cord connected to the electric instrument and to the AC adapter are removably mounted, the sub-housing being detachably attached to a periphery of an underside of the main housing.

* * * * *